(12) United States Patent  (10) Patent No.: US 7,711,238 B2
Ikeda et al.  (45) Date of Patent: May 4, 2010

(54) OPTICAL FIBER AND OPTICAL FIBER COUPLER, ERBIUM-DOPED OPTICAL FIBER AMPLIFIER, AND OPTICAL WAVEGUIDE USING THE SAME

(75) Inventors: Masashi Ikeda, Sakura (JP); Masakazu Nakayama, Sakura (JP); Kuniharu Himeno, Sakura (JP); Masaaki Ohtsuka, Sakura (JP); Masakazu Oohashi, Sakura (JP); Daiichiro Tanaka, Sakura (JP)

(73) Assignee: Fujikura Ltd., Tokyo (JP)

( * ) Notice: Subject to any disclaimer, the term of this patent is extended or adjusted under 35 U.S.C. 154(b) by 398 days.

(21) Appl. No.: 11/864,375

(22) Filed: Sep. 28, 2007

(65) Prior Publication Data

US 2008/0025679 A1 Jan. 31, 2008

Related U.S. Application Data

(63) Continuation of application No. 11/028,756, filed on Jan. 5, 2005, now Pat. No. 7,346,258, which is a continuation of application No. PCT/JP03/08598, filed on Jul. 7, 2003.

(30) Foreign Application Priority Data

Jul. 9, 2002 (JP) ............................. 2002-199959

(51) Int. Cl.
*G02B 6/00* (2006.01)
(52) U.S. Cl. ...................................... 385/144
(58) Field of Classification Search ........................ None
See application file for complete search history.

(56) References Cited

U.S. PATENT DOCUMENTS 5,289,558 A 2/1994 Teichler et al.
5,381,503 A 1/1995 Kanamori et al.
5,778,129 A 7/1998 Shukunami et al.

(Continued)

FOREIGN PATENT DOCUMENTS

CN 1282879 A 2/2001

(Continued)

OTHER PUBLICATIONS

A. Wada et al., "High-Efficiency Erbium-Doped Fiber Amplifier Using Mode Field Diameter Adjusting Technique", OAA 1991, pp. 258-261.

(Continued)

*Primary Examiner*—Timothy Rude
(74) *Attorney, Agent, or Firm*—Sughrue Mion, PLLC

(57) ABSTRACT

An optical fiber that includes a core containing a first concentration of germanium, an inner cladding arranged on the core, the inner cladding containing a second concentration of germanium and having a first diffusion coefficient, and an outer cladding arranged on the inner cladding, the outer cladding having a second diffusion coefficient, where the first diffusion coefficient is larger than the second diffusion coefficient, and where the first concentration of germanium is about 200% or more of the second concentration of germanium. An optical fiber constructed in this manner can be spliced with an optical fiber having a different MFD, such as a single-mode optical fiber or an erbium-doped optical fiber, with low splice loss and a sufficient splicing strength.

7 Claims, 6 Drawing Sheets

U.S. PATENT DOCUMENTS

| | | | |
|---|---|---|---|
| 5,861,973 A | 1/1999 | Inagaki et al. | |
| 5,933,561 A | 8/1999 | Sugizaki | |
| 6,599,957 B2 | 7/2003 | Dawes et al. | |
| 6,702,481 B2 | 3/2004 | Oki et al. | |
| 6,904,213 B2 | 6/2005 | Fleury et al. | |
| 7,346,258 B2* | 3/2008 | Ikeda et al. | 385/144 |
| 7,406,236 B2* | 7/2008 | Ikeda et al. | 385/126 |
| 2002/0001444 A1 | 1/2002 | Hirano et al. | |
| 2002/0025131 A1 | 2/2002 | Ishikawa et al. | |
| 2003/0048524 A1 | 3/2003 | Chavez-Pirson et al. | |
| 2003/0169489 A1 | 9/2003 | Jiang et al. | |
| 2004/0052495 A1* | 3/2004 | Englund et al. | 385/141 |
| 2006/0187540 A1 | 8/2006 | Andrejco et al. | |

FOREIGN PATENT DOCUMENTS

| | | |
|---|---|---|
| CN | 1330276 A | 1/2002 |
| CN | 1340724 A | 3/2002 |
| CN | 1381082 A | 11/2002 |
| EP | 0 536 496 A2 | 4/1993 |
| EP | 0 585 533 A1 | 3/1994 |
| EP | 0 762 159 | 3/1997 |
| EP | 0 785 448 | 7/1997 |
| EP | 1 170 604 A2 | 1/2002 |
| EP | 1 184 692 A2 | 3/2002 |
| EP | 1 202 089 | 5/2002 |
| EP | 1 207 597 A1 | 5/2002 |
| JP | S57-11848 A | 1/1982 |
| JP | 60-154215 A | 8/1985 |
| JP | H05-219536 A | 8/1993 |
| JP | H05-224060 A | 9/1993 |
| JP | 9-236721 | 9/1997 |
| JP | H09-236721 A | 9/1997 |
| JP | H10-206659 A | 8/1998 |
| JP | 2911932 B2 | 4/1999 |
| JP | 2000-356723 | 12/2000 |
| JP | 2001-66439 A | 3/2001 |
| JP | 2002-9376 A | 1/2002 |
| JP | 2002-71997 A | 3/2002 |
| JP | 2002-82251 A | 3/2002 |
| KR | 2001-0010769 A | 2/2001 |
| KR | 2002-0018090 A | 3/2002 |
| TW | 492233 | 6/2002 |

OTHER PUBLICATIONS

Y. Mitsunaga et al., "Strength Assurance of Optical Fiber Based on Screening Test", Trans. IEICE Jul. 1983, vol. J.66-B, No. 7, pp. 829-836.

Hu A, et al., "Miniature optic fiber couplers for fiber optic gyros application", SPIE-INT. Soc. Opt. Eng USA, vol. 2837, (Nov. 1996), pp. 324-334.

Tajima K: "ER3+-Doped Single-Polarisation Optical Fibers" Electronics Letters, lee Stevenage, GB vol. 26, No. 18 Aug. 30, 1990 pp. 1498-1499 XP000108664.

Kliner D A C et al: "Polarization-Maintaining Amplifier Employing Double-Clad Bow-Tie Fiber" Optics Letters, OSA, Optical Society of America, Washington, DC, US vol. 26, No. 4, Feb. 15, 2001, pp. 184-186, XP001038937.

Segi T; Ouchi Y; Nishiwaki K; Sakai T; Nishide K; Wada A: "Polarization-maintaining EDFA for optical sensing application, composed of PANDA fiber based low loss and low cross-talk optical components" 2002 15$^{th}$ Optical Fiber Sensors Conference Technical Digest. OFS 2002 (CAT. No. 02EX533) 2002 IEEE, vol. 1, May 10, 2002, pp. 289-292, XP002400410.

\* cited by examiner

OPTICAL FIBER AND OPTICAL FIBER COUPLER, ERBIUM-DOPED OPTICAL FIBER AMPLIFIER, AND OPTICAL WAVEGUIDE USING THE SAME

CROSS-REFERENCE TO RELATED APPLICATIONS

This Application is based upon and claims the benefit of priority from Japanese Patent Application No. 2002-199959, filed on Jul. 9, 2002 in the Japanese Patent Office, the entire content of which is incorporated herein by reference.

BACKGROUND OF THE INVENTION

The invention relates to an optical fiber that is employed in an optical component used for optical communications, to an optical fiber coupler, to an erbium-doped optical fiber amplifier, and to an optical waveguide using the same. More specifically, the invention relates to an optical fiber that can couple with another optical fiber having a different mode field diameter (MFD) with low splice loss and a sufficient splicing strength when fusion-spliced together, to an optical fiber coupler, to an erbium-doped optical fiber amplifier, and to an optical waveguide using the same.

DESCRIPTION OF RELATED ART

When two optical fibers having different mode field diameters (hereinafter referred to as "MFDs") are fusion-spliced together, splice loss occurs. A method for reducing such splice loss is known in which optical fibers are preheated before they are fusion-spliced, or optical fibers are subjected to a heat treatment by means of additional electrical discharge, for example, after they are fusion-spliced together, so that a dopant contained in the core diffuses into the cladding and the MFD of the optical fiber having a smaller MFD is enlarged, which results in reduction in the difference of the MFDs of the optical fibers.

The change in the core radius due to diffusion of a dopant contained in a core of an optical fiber is expressed by the following Formula (1):

$$r_2 = (r_1^2 + 4Dt)^{1/2} \quad (1)$$

In the above-described Formula (1), $r_1$ is a core radius before the diffusion of the dopant and $r_2$ is a core radius after the diffusion of the dopant. D is a diffusion coefficient and "t" is the length of time for which the optical fibers are heated. Since the normalized frequency of an optical fiber ($\propto$ core radius$\times\Delta^{1/2}$) remains constant even when the dopant in the core diffuses, the MFD is proportional to the core radius $r_2$ in the above-described Formula (1). Thus, as the core radius $r_2$ is enlarged according to the above-described Formula (1) by causing the dopant in the core to diffuse, the MFD enlarges accordingly.

Upon fusion-splicing optical fibers having different MFDs together, in order to reduce the splice loss by application of heat treatment (e.g., by additional electrical discharge after fusion splicing), several requirements should be met. As such requirements, the speed of enlargement of the MFD of each of optical fibers to be spliced together with respect to heating time must be different, i.e., diffusion coefficients of the dopants must be different. In addition, the speed of enlargement of the MFD of an optical fiber having a smaller MFD with respect to heating time must be larger, i.e., DLM<DSM (where DLM is the diffusion coefficient of the optical fiber having a larger MFD and DSM is the diffusion coefficient of the optical fiber having a smaller MFD).

If these requirements are met, the speed of enlargement of the MFD of the optical fiber having a smaller MFD will become greater than the speed of enlargement of the MFD of the optical fiber having a larger MFD when a dopant contained in the core is diffused by application of heat (e.g., by means of additional electrical discharge). As a result, the difference in the MFDs will be reduced with respect to heating time, and the splice loss is reduced.

One example of well-known methods for splicing optical fibers having different MFDs together is a technique disclosed in Japanese Patent No. 2911932. In this method, upon fusion-splicing: (1) a single-mode optical fiber which has zero-dispersion wavelength around 1.3 µm (hereinafter referred to as "single-mode optical fiber") that is used as an optical transmission path for optical communications; and (2) an optical fiber having a numerical aperture between 0.24 and 0.15 (hereinafter referred to as "high numerical aperture optical fiber") together, splice loss can be reduced by heat treatment during the fusion splicing and post-heat treatment after fusion splicing. The single-mode optical fiber has a core diameter of about 8 µm, an MFD of about 10 µm, and a refractive index difference Δn between the core and the cladding of about 0.004.

In contrast, the high numerical aperture optical fiber has a smaller core diameter (about 4 µm) and MFD (about 4 µm) than the single-mode optical fiber, and has a relatively large refractive index difference Δn between the core and the cladding of between 0.02 and 0.008. Therefore, the concentration of a dopant in the core of the high numerical aperture optical fiber is higher than the concentration of a dopant in the core of the single-mode optical fiber. Since the concentration of a dopant in the core is higher in the high numerical aperture optical fiber, the core thereof has a lower softening temperature and consequently the diffusion rate of the dopant at a given temperature is significantly greater compared to the single-mode optical fiber. As a result, the diffusion coefficient of the high numerical aperture optical fiber is higher than the diffusion coefficient of the single-mode optical fiber. The above-described requirements for reducing the splice loss are satisfied because the high numerical aperture optical fiber has a smaller MFD and a larger diffusion coefficient while the single-mode optical fiber has a larger MFD and smaller diffusion coefficient.

In contrast, when optical fibers that have different MFDs and similar diffusion coefficients are fusion-spliced together, it is difficult to realize low splice loss using the splicing method mentioned above. A method for reducing splice loss for such cases is known in which a cladding of an optical fiber having a smaller MFD is doped with fluorine such that the diffusion rate of the dopant in the core of this optical fiber becomes higher than the diffusion rate of a dopant in a core of an optical fiber having a larger MFD. One example of this technique is a method for fusion-splicing an erbium-doped optical fiber employed in an erbium-doped optical fiber amplifier and a dispersion-shifted single-mode optical fiber together.

In this method, the MFD of the erbium-doped optical fiber is 5 µm and the MFD of the dispersion-shifted single-mode optical fiber is 8 µm at a signal wavelength of 1550 nm, for example. The cladding of the erbium-doped optical fiber is doped with fluorine such that the diffusion rate of a dopant contained in the core into the cladding is increased. Although the dopant in the core diffuses to the cladding and the MFD is enlarged by the application of heat after fusion-splicing the erbium-doped optical fiber and the dispersion-shifted single-mode optical fiber together, the splice loss is reduced to 0.05 dB or smaller since the speed of enlargement of the MFD of the erbium-doped optical fiber that has a smaller MFD is greater than the speed of enlargement of the MFD of the dispersion-shifted single-mode optical fiber.

Examples of fusion-splicing optical fibers having different MFDs together include connecting between a fused and elongated optical fiber coupler employed in an erbium-doped optical fiber amplifier and an erbium-doped optical fiber or a single-mode optical fiber.

FIG. 8 is a schematic diagram illustrating one example of the constitution of an erbium-doped optical fiber amplifier.

The erbium-doped optical fiber amplifier of this example generally includes an erbium-doped optical fiber 1, a 980 nm semiconductor laser 2 that is an excitation light source for exciting the erbium-doped optical fiber 1, an optical fiber coupler 3 for multiplexing the excitation light and the signal light, a single-mode optical fiber 4 for connecting these components, and a 980 nm cut-off shifted single-mode optical fiber 5.

In the erbium-doped optical fiber amplifier of this example, the erbium-doped optical fiber 1 and the optical fiber coupler 3 are optical components that include an optical fiber.

The erbium-doped optical fiber 1 and the optical fiber coupler 3 are fusion-spliced, and the optical fiber coupler 3 and the single-mode optical fiber 4 are fusion-spliced.

The MFD of the single-mode optical fiber 3 for light in a 1550 nm wavelength band is about 10 µm. The effective cut-off wavelength of the single-mode optical fiber 3 is 1300 nm or less.

The effective cut-off wavelength of the erbium-doped optical fiber 1 and the optical fiber coupler 3 must be smaller than 980 nm since the light output from the 980 nm semiconductor laser 2 is required to be propagated in a single mode in the erbium-doped optical fiber 1 and the optical fiber coupler 3.

It is required that the optical fiber coupler 3 propagate light with a wavelength of 980 nm in a single mode, and propagate light at a wavelength of 1550 nm with low loss. However, since the effective cut-off wavelength of the optical fiber coupler 3 is located in a wavelength region far shorter than 1550 nm, the bending loss tends to be relatively increased when propagating light in a 1550 nm wavelength band. Accordingly, the optical fiber employed in the optical fiber coupler 3 should have a large relative refractive index difference between the core and the cladding, and should have a low bending loss in a 1550 nm wavelength band. Furthermore, to reduce the effective cut-off wavelength of the optical fiber coupler 3 to 980 nm or lower while increasing the relative refractive index difference between the core and the cladding of the optical fiber, the core diameter of the optical fiber included in the optical fiber coupler 3 should be smaller. Consequently, the MFD is reduced accordingly.

On the other hand, the core doped with erbium of the erbium-doped optical fiber 1 is required to be excited by excitation light output from the 980 nm semiconductor laser 2 that is an excitation light source. Accordingly, the erbium-doped optical fiber 1 generally has a high numerical aperture in order to enhance the excitation efficiency. Thus, the MFD is reduced accordingly.

It should be noted that in order to obtain a high-performance erbium-doped optical fiber amplifier, upon fusion-splicing an erbium-doped optical fiber and an optical fiber coupler, and fusion-splicing an optical fiber coupler and a single-mode optical fiber, they are required to be spliced with low loss, and the spliced portion is required to have a sufficient strength for practical use.

The size of a MFD for light having a wavelength of 1550 nm is about 10 µm in a single-mode optical fiber, about 6.5 µm in an optical fiber coupler, and about 5.5 µm in an erbium-doped optical fiber.

An optical fiber coupler is required to be spliced with either a single-mode optical fiber or an erbium-doped optical fiber with low loss, as well as to have a sufficient strength for practical use. Although the MFD of an optical fiber coupler has been conventionally small, the relative refractive index difference between the core and the cladding of an optical fiber included in an optical fiber coupler is increased so as to reduce the bending loss for light in a 1550 nm wavelength band, which results in an increase in the numerical aperture. Accordingly, splice loss between an optical fiber coupler and a single-mode optical fiber can be reduced.

Here, FIG. 9 is a diagram illustrating the change in the MFDs with respect to heating time of an optical fiber coupler and a single-mode optical fiber.

FIG. 9 indicates that a minimum splice loss is attained at a point in which the MFDs of the optical fiber coupler and the single-mode optical fiber are matched. It should be noted that although the above-described Formula (1) prescribes that the square of the MFD is proportional to heating time, the square of the MFD is not necessarily proportional to heating time since the diffusion coefficient varies depending on the heating temperature.

However, as for the splicing strength, the fusion method disclosed in Japanese Patent No. 2911932 is not necessarily the one that can provide a sufficient strength. When an optical fiber coupler and a single-mode optical fiber are fusion-spliced according to the fusion method disclosed in Japanese Patent No. 2911932, a heating time of about 30 seconds is required until splice loss reaches the lowest value. When optical fibers of the same kind are fusion-spliced with a conventional fusion splicing method, only 2 to 3 seconds of splicing time is sufficient for a fusion splicing the optical fibers with low splice loss and a sufficient strength. A fusion splicing time for fusion-splicing an optical fiber coupler and a single-mode optical fiber of about 30 seconds is considerably longer than the fusion splicing optical fibers of the same kind. Thus, the splicing strength between an optical fiber coupler and a single-mode optical fiber is not necessarily comparable to the splicing strength between the optical fibers of the same kind.

Furthermore, when splicing an erbium-doped optical fiber and an optical fiber coupler, it is difficult to achieve low loss and to obtain a spliced portion having a sufficient strength for practical use with the method disclosed in Japanese Patent No. 2911932 or other methods. This is because the values of the MFD of an erbium-doped optical fiber and the MFD of an optical fiber coupler are relatively close, and both the erbium-doped optical fiber and the optical fiber coupler have high numerical apertures. Since an erbium-doped optical fiber and an optical fiber coupler have high numerical apertures, concentrations of the dopant in the core are high and diffusion coefficients are large in the erbium-doped optical fiber and the optical fiber coupler. As a result, the heating time of a spliced portion required until the MFDs of the erbium-doped optical fiber and the fiber coupler are matched and the lowest loss is achieved is very short.

Here, FIG. 10 is a diagram illustrating the change in the MFD of an optical fiber coupler and an erbium-doped optical fiber with respect to heating time.

FIG. 10 indicates that the MFDs of the erbium-doped optical fiber and the fiber coupler are matched and the lowest loss is achieved before the fusion splicing is completed. Thus, if the fusion splicing is stopped at the point in time when the MFDs is matched, a splicing having a sufficient strength for practical use cannot be obtained whereas low splice loss is achieved.

Furthermore, in order to enhance the light amplification characteristic of an erbium-doped optical fiber, it is required to dope aluminum, i.e., one type of dopant, into the core at a high concentration. The doping of aluminum at a high concentration will cause an increase in the diffusion coefficient of the dopant. Accordingly, as the light amplification characteristic of the erbium-doped optical fiber is enhanced, it becomes more difficult to improve splicing strength between the erbium-doped optical fiber and the optical fiber coupler. For the reasons mentioned above, there is a need for an improved optical fiber coupler in order to achieve both an improvement in the amplification characteristic of an erbium-doped optical fiber and an improvement in splicing strength between the erbium-doped optical fiber and the optical fiber coupler.

Upon splicing an erbium-doped optical fiber and an optical fiber coupler, in order to achieve both low loss and sufficient splicing strength for practical use, the diffusion coefficient of the optical fiber included in the optical fiber coupler should be increased such that the heating time until the MFDs of an erbium-doped optical fiber and an optical fiber coupler are matched becomes sufficiently long. As a method for increasing the diffusion coefficient of the optical fiber included in the optical fiber coupler, a method of doping fluorine into a cladding that is described in a known document (A. Wada, T. Sakai, D. Tanaka, T. Nozawa and R. Yamauchi, OAA 1991, FD3, 1991, "High-Efficiency Erbium-Doped Fiber Amplifier using Mode Field Diameter Adjusting Technique") can be applied to an optical fiber included in the optical fiber coupler. However, the effect of increasing the diffusion coefficient will be limited if the amount of doped fluorine is small.

When the amount of doped fluorine is large, the relative refractive index difference between the core and the cladding will significantly change, which results in a change in the transmission characteristics. In addition, splicing with low splice loss cannot be achieved by simply increasing the diffusion coefficient of the optical fiber included in the optical fiber coupler to a value larger than the diffusion coefficient of an erbium-doped optical fiber since the MFDs of the optical fiber coupler and the erbium-doped optical fiber will not be matched by a change in the heating time.

BRIEF SUMMARY OF THE INVENTION

The invention was conceived in view of the above-mentioned background, and one object thereof is to provide an optical fiber that can be fusion-spliced with another optical fiber having a different mode field diameter (MFD) with low splice loss and a sufficient splicing strength, an optical fiber coupler, erbium-doped optical fiber amplifier, and an optical waveguide using the same.

In one aspect, the invention is an optical fiber, including: a core containing a first concentration of germanium; an inner cladding arranged on the core, the inner cladding containing a second concentration of germanium and having a first diffusion coefficient; and an outer cladding arranged on the inner cladding, the outer cladding having a second diffusion coefficient, where the first diffusion coefficient is larger than the second diffusion coefficient, and where the first concentration of germanium is about 200% or more of the second concentration of germanium.

In another aspect of the optical fiber of the invention, the core is silica glass.

In another aspect of the optical fiber of the invention, the core is arranged at the center of the optical fiber.

In another aspect of the optical fiber of the invention, the inner cladding is concentric to the core.

In another aspect of the optical fiber of the invention, the inner cladding is silica glass containing germanium, phosphorus, and fluorine.

In another aspect of the optical fiber of the invention, the outer cladding is silica glass.

In another aspect of the optical fiber of the invention, a diameter of the inner cladding is between 10 μm and 40 μm.

In another aspect of the optical fiber of the invention, a concentration of the germanium is between 0.2 and 1.5% by weight, a concentration of phosphorus is between 0.5 and 1.5% by weight, and a concentration of fluorine is between 0.1 and 1.0% by weight in the inner cladding.

In another aspect of the optical fiber of the invention, an outer diameter of the optical fiber is between 70 μm and 90 μm.

In another aspect of the optical fiber of the invention, two stress-applying parts are symmetrically disposed with respect to the core within the cladding.

In other aspects of the invention, the optical fiber mentioned above is provided in an optical fiber coupler an erbium-doped optical fiber amplifier, or as a pigtail fiber of an optical waveguide.

BRIEF DESCRIPTION OF THE DRAWINGS

The above and other objects, features and advantages of the invention will become more apparent by describing in detail exemplary embodiments thereof with reference to the attached drawings in which.

DETAILED DESCRIPTION OF EXEMPLARY EMBODIMENTS

Figure 1:
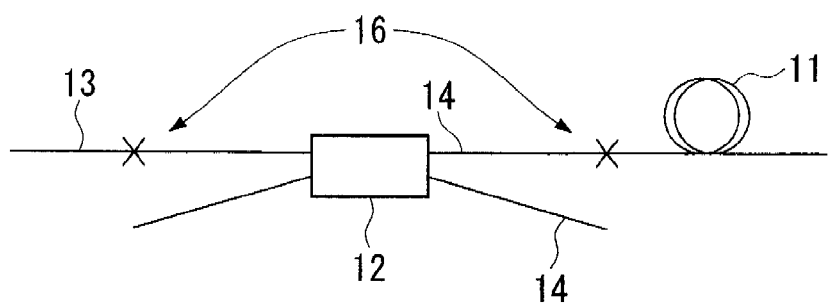
FIG. 1 is a schematic diagram of an exemplary embodiment of the invention illustrating a portion of an erbium-doped optical fiber amplifier.

Exemplary embodiments of the invention will now be described below by reference to the attached Figures. The described exemplary embodiments are intended to assist the understanding of the invention, and are not intended to limit the scope of the invention in any way.

In an exemplary embodiment, the optical fiber of the invention is an optical fiber including a core that is provided at a center, the core being made of silica glass containing at least germanium; an inner cladding having a large diffusion coefficient, the inner cladding being provided around the core and concentric to the core, and an outer cladding having a small diffusion coefficient, the outer cladding being provided around the inner cladding, in which the inner cladding contains germanium, and a concentration of germanium in the core is about 200% or more of a concentration of germanium in the inner cladding.

By constructing an optical fiber having such a structure, it is possible to modify the manner in which the MFD of the optical fiber changes with respect to heating time of the spliced portion after fusion splicing. Specifically, in the optical fiber of the invention, the MFD rapidly increases in an early stage of the heating, and the speed of enlargement of the MFD gradually slows down in the middle and end stages. Such a phenomenon is observed because germanium doped in the core diffuses to the cladding when the heating is started, and the MFD rapidly increases. The speed of migration of germanium is relatively large in an early stage of the heating since germanium diffuses in the inner cladding in which the diffusion coefficient is larger. In the middle and end stages of the heating, as the germanium reaches the outer cladding in which the diffusion coefficient is smaller, the speed of enlargement of the MFD is delayed and the rate of the enlargement gradually slows down since the speed of the diffusion of germanium into the outer cladding slows downs.

For example, when an optical fiber constructed according to the invention and an erbium-doped optical fiber are fusion-spliced and the spliced portion between these fibers is heated, the MFD of the optical fiber of the invention is greater in an early stage of the heating. However, the speed of enlargement of the MFD of the optical fiber of the invention gradually slows down in the middle and end stages of the heating, and eventually the MFD of the optical fiber of the invention and the MFD of the erbium-doped optical fiber are matched. As a result, the splice loss between the optical fiber of the invention and the erbium-doped optical fiber is reduced. In addition, the spliced portion between the optical fiber of the invention and the erbium-doped optical fiber has a sufficient strength since the spliced portion has been heated long enough to reduce the splice loss.

Furthermore, since the MFD of the optical fiber of the invention rapidly enlarges in the early stage of the heating when the optical fiber of the invention and a single-mode optical fiber are fusion-spliced, it is possible to match the MFD of the optical fiber of the invention and the MFD of the single-mode optical fiber in a relatively short time. As a result, it is possible to prevent deterioration of the strength of the optical fiber caused by long heating since the time required for enlarging the MFD of the optical fiber of the invention can be shortened. Accordingly, fusion splicing having both a sufficient splicing strength and low loss is realized.

The inner cladding of the optical fiber of the invention may be made of silica glass containing germanium (Ge), phosphorus (P), and fluorine (F), and the outer cladding is made from silica (SiO2). It should be noted, however, that silicon tetrachloride (SiCl4) may be used as a starting material for forming the outer cladding, and a small amount of chlorine is contained as a impurity in the outer cladding in such a case, which does not cause any particular problem. By constructing an optical fiber having such a structure, the diffusion rate of germanium doped in the core into the inner cladding will be relatively increased while the diffusion rate of germanium into the outer cladding will be relatively reduced. By doping three elements, i.e., germanium, phosphorus, and fluorine, in the inner cladding, it is possible to increase the diffusion rate of the dopants compared to an optical fiber in which only fluorine is doped.

The diameter of the core of the optical fiber of the invention may be 9 µm or smaller.

Furthermore, the diameter of the inner cladding of the optical fiber of the invention may be between 10 µm and 40 µm, and more preferably, but not necessarily, between 15 µm and 25 µm.

If the diameter of the inner cladding is smaller than 10 µm, the effect of inhibiting the enlargement of the MFD will occur in an early stage of the heating, and the splice loss will reach the lowest value before a sufficient splicing strength is obtained when fusion-splicing the optical fiber of the invention and an erbium-doped optical fiber. In contrast, if the diameter of the inner cladding exceeds 40 µm, when fusion-splicing the optical fiber of the invention and a single-mode optical fiber, the MFD of the optical fiber of the invention and the MFD of the single-mode optical fiber will be matched before the effect of inhibiting the enlargement of the MFD is obtained by heating the optical fiber of the invention. As a result, the splice loss will reach the lowest value before a sufficient splicing strength is achieved.

By setting the diameter of the inner cladding of the optical fiber of the invention to the above-mentioned range, the optical fiber of the invention can be spliced with a single-mode optical fiber or an erbium-doped optical fiber with low loss and a sufficient splicing strength.

When fabricating an optical fiber coupler, two optical fibers are arranged in parallel, and portions of the fibers are fused by heating them, and the fused portion is elongated while heating. In this process, the MFDs of the two optical fibers will enlarge since a dopant contained in the core diffuses to cladding due to heating and elongation in the optical fibers. The rate of the enlargement of the MFD caused by heating and elongation is related to the coupling length (the length of the fused-elongated portion) of an optical fiber coupler, and it is possible to reduce the coupling length to a relatively small value if the speed of enlargement of the MFD is large. By reducing coupling length, it is possible to reduce the size of an optical fiber coupler. It should be noted, however, that if the speed of enlargement of the MFD is too large, the MFD of an end of the coupling portion (the Y-shaped portion of the optical fiber coupler) will be enlarged to an excessive degree. As a result, there will be a difference between the MFD in regions other than the coupling portion and the MFD of the end of the coupling portion in the optical fiber used in the optical fiber coupler.

If there is a large difference in the MFD in certain regions, a loss is incurred when light propagates through such regions, which results in an excessive loss in the optical fiber coupler. In order to obtain an excellent optical fiber coupler with a reduced size and low excess loss, it is required to use an optical fiber in which the speed of enlargement of the MFD is large during heating and elongation while the MFD does not enlarge to an excessive degree when heating and elongation is completed.

According to the optical fiber of the invention, by setting the diameter of the inner cladding to values in the above-mentioned range, it is possible to obtain an excellent optical fiber coupler with a reduced size and low excess loss. In addition, the optical fiber coupler can be fusion-spliced with a single-mode optical fiber or an erbium-doped optical fiber with low loss and a sufficient splicing strength.

In the optical fiber of the invention, the concentration of germanium in the core may be between 3.0 and 21.0% by weight, and the concentration of fluorine may be between 0.1 and 1.0% by weight.

Preferably, but not necessarily, the concentration of germanium may be between 0.2 and 1.5% by weight, the concentration of phosphorus may be between 0.5 and 1.5% by weight, and the concentration of fluorine may be between 0.1 and 1.0% by weight in inner cladding. More preferably, but again not necessarily, the concentration of germanium may be between 0.8 and 1.2% by weight, the concentration of phosphorus may be between 0.8 and 1.2% by weight, and the concentration of fluorine may be between 0.3 and 0.7% by weight in the inner cladding.

The effect of inhibiting the enlargement of the MFD that is achieved by heating the optical fiber of the invention is related to the diffusion rates of dopants, i.e., germanium, phosphorus, and fluorine in the inner cladding, and consequently is related to the concentrations of these dopants in the inner cladding. By setting the concentrations of dopants in the inner cladding of the optical fiber of the invention to the above-mentioned ranges, the optical fiber of the invention can be spliced with a single-mode optical fiber or an erbium-doped optical fiber with low loss and a sufficient splicing strength.

If the concentrations of dopants, i.e., germanium, phosphorus, and fluorine, in the inner cladding are smaller than the lower limits described above, the diffusion rates of dopants in the inner cladding will be limited, and the splice loss will reach the lowest value before a sufficient splicing strength is achieved when fusion-splicing the optical fiber of the invention and an erbium-doped optical fiber. In contrast, if the concentrations of dopants, i.e., germanium, phosphorus, and fluorine, in the inner cladding exceeds the upper limits described above, the MFD of the optical fiber of the invention and the MFD of a single-mode optical fiber will be matched before the effect of inhibiting the enlargement of the MFD is obtained that is achieved by heating the optical fiber of the invention. As a result, the splice loss will reach the lowest value before a sufficient splicing strength is achieved.

In addition, the outer diameter of the optical fiber of the invention may be between 70 μm and 90 μm, and more preferably, but not necessarily, between 75 μm and 85 μm.

Additionally, in optical components employing an optical fiber, such as an erbium-doped optical fiber amplifier, size reduction of the components has been demanded. In order to reduce the size of such optical components, it is required to reduce the outer diameter of an optical fiber below the conventional outer diameter of 125 μm so that an allowable bending radius of the optical fiber is reduced and the fiber is compactly encased. According to the optical fiber of the invention, by setting the outer diameter of the optical fiber to values in the above-mentioned range, it is possible to obtain an excellent optical component with a reduced size and a low bending loss. In addition, the optical component can be fusion-spliced with a single-mode optical fiber or an erbium-doped optical fiber with low loss and a sufficient splicing strength.

Furthermore, it is possible to reduce the size of a fused and elongated type optical fiber coupler by employing the optical fiber of the invention having an outer diameter between 70 μm and 90 μm. The reduction in the size of a fused and elongated type optical fiber coupler is achievable by reducing the length of the coupling length (the length of the fused-elongated portion) of the coupler. Since the optical fiber of the invention has a smaller outer diameter of between 70 μm and 90 μm than a conventional optical fiber having an outer diameter of 125 μm, it is possible to reduce the coupling length for obtaining mode coupling to a value smaller than the conventional optical fiber. Thus, it is possible to reduce the size of the optical fiber coupler.

Furthermore, the optical fiber of the invention may be a polarization maintaining optical fiber that has two stress-applying parts that are symmetrically disposed with respect to the core within the cladding around the core.

Polarization interleave multiplexing is one of the dense wavelength multiplexing techniques that meets the recent demands for communications. A polarization maintaining erbium-doped optical fiber amplifier can amplify signal light while maintaining the plane of polarization, and such an amplifier is essential for the polarization interleave multiplexing. Accordingly, an erbium-doped optical fiber, or an optical fiber coupler, or the like that is used as main components of such a polarization maintaining erbium-doped optical fiber amplifier should exhibit a polarization maintaining characteristic. It is known that polarization maintaining optical components can be obtained by fabricating fiber-type optical components using a polarization maintaining optical fiber, such as a PANDA optical fiber having two stress-applying parts that are symmetrically disposed with respect to the core within the cladding around the core or a so-called bow-tie optical fiber. In addition, in a polarization maintaining erbium-doped optical fiber amplifier, a splicing with low loss and a sufficient splicing strength is required when splicing respective components. For the above-described reasons, a polarization maintaining optical fiber may be used as the optical fiber of the invention that is used in a polarization maintaining erbium-doped optical fiber amplifier.

Furthermore, the optical fiber coupler of the invention may be a fused and elongated type optical fiber coupler fabricated using the optical fiber of the invention.

Since the optical fiber of the invention can be spliced with a single-mode optical fiber or an erbium-doped optical fiber with low loss and a sufficient splicing strength, the optical fiber coupler of the invention will be similarly an optical fiber coupler spliced with low loss and a sufficient splicing strength.

The erbium-doped optical fiber amplifier of the invention is fabricated using the optical fiber of the invention, and generally includes fiber-type optical components and non-fiber-type optical components.

In general, optical components used in an erbium-doped optical fiber amplifier have different MFDs. For this reason, in the erbium-doped optical fiber amplifier, it is essential to connect components having different MFDs with low loss and a sufficient splicing strength. In the erbium-doped optical fiber amplifier of the invention, a splicing with low loss and a sufficient splicing strength can be realized, and as a result, the performance can be enhanced by inserting the optical fibers of the invention between connectors of each of the components to connect them, rather than directly connecting the components.

An optical waveguide of the invention is fabricated using the optical fiber of the invention as a pigtail fiber, and is a fiber-type optical component in which two or more different kinds of optical fibers or optical components are coupled.

In general, it is required to introduce light having a wavelength of 1550 nm from a single-mode optical fiber used for optical communications into an optical waveguide. However, the MFD of a single-mode optical fiber and the MFD of the optical waveguide are different. Accordingly, by using an optical waveguide in which the optical fiber of the invention is used as a pigtail fiber, this optical waveguide and a single-mode optical fiber can be spliced with low loss and a sufficient splicing strength.

The above exemplary embodiment will now be further described in view of the following detailed examples and comparisons. It should be understood, however, that the invention is not limited to the particular examples described herein.

Example 1

FIG. 1 is a schematic diagram illustrating a portion of an erbium-doped optical fiber amplifier.

The erbium-doped optical fiber amplifier of this example generally includes an erbium-doped optical fiber 11 and an optical fiber coupler 12 that is made by fusing and elongating optical fibers 14 and 14, and a single-mode optical fiber 13 that is spliced with the optical fiber 14 of the invention used in the optical fiber coupler 12.

As shown in FIG. 1, the optical fiber coupler 12, and the erbium-doped optical fiber 11 and the single-mode optical fiber 13 are spliced together via fusion-spliced portions 16 in the erbium-doped optical fiber amplifier of this example. The splice loss and the splicing strength of the optical fiber coupler 12 are the same as the splice loss and the splicing strength of the optical fibers 14 and 14 used therein. The optical fiber of the invention and a conventional high NA optical fiber were used as the optical fibers 14 and 14 employed in the optical fiber coupler 12, and an optical fiber coupler 12 employing two optical fibers of the invention and another optical fiber coupler 12 employing two conventional optical fibers having a high numerical aperture were fabricated.

Figure 2A:
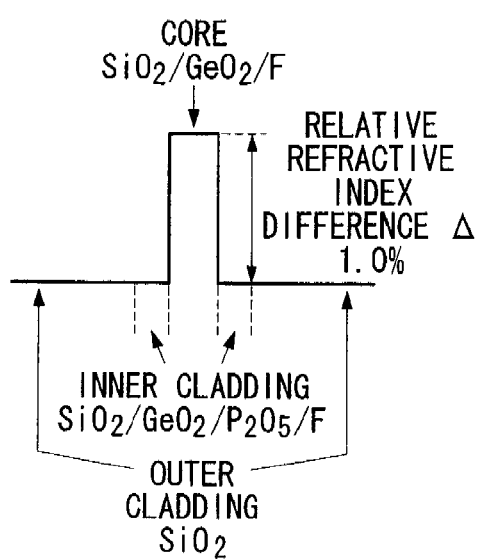
FIG. 2 is a diagram illustrating refractive index profiles of the optical fiber shown in FIG. 1.
Figure 2B:
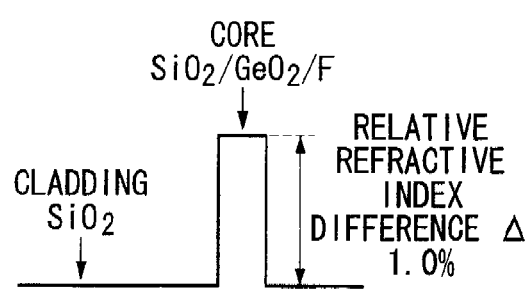

Here, FIG. 2 is a diagram illustrating refractive index profiles of optical fibers, in which FIG. 2(a) illustrates a refractive index profile of the optical fiber of the invention, and FIG. 2(b) illustrates a refractive index profile of the conventional high NA optical fiber.

As shown in FIG. 2(a), the optical fiber of the invention has a two-layered cladding structure in which the outer periphery of the core is surrounded by cladding in which the refractive index is smaller than in the core, and the cladding includes an inner cladding and an outer cladding, each of which has a different composition.

The core was made of silica-based glass doped with germanium (Ge) and fluorine (F) ($SiO_2/GeO_2/F$), and the contents of the dopants were 12% by weight, and 0.2% by weight for germanium and fluorine, respectively.

The inner cladding was made of silica-based glass doped with germanium, phosphorus (P), and fluorine ($SiO_2/GeO_2/P_2O_5/F$), and the contents of the dopants were about 1% by weight, about 1% by weight, and about 0.5% by weight for germanium, phosphorus and fluorine, respectively.

The outer cladding is made of silica-based glass ($SiO_2$).

There was little relative refractive index difference Δ between the inner cladding and the outer cladding, and the diameter of the inner cladding was 20 μm.

As shown in FIG. 2(b), the conventional high NA optical fiber is an optical fiber in which the outer periphery of the core is surrounded by the cladding in which the refractive index is smaller than in the core.

The core was made of silica-based glass doped with germanium and fluorine ($SiO_2/GeO_2/F$), and the contents of the dopants were 12% by weight, and 0.2% by weight for germanium and fluorine, respectively.

The cladding was made of pure silica-based glass ($SiO_2$).

Characteristics of each of the optical fibers used in the erbium-doped optical fiber amplifier shown in FIG. 1 are listed in Table 1.

TABLE 1

| Type of fiber | Relative RI difference Δ (%) | NA | Core diameter (μm) | MFD (@1550 nm) (μm) | Effective cut-off wavelength (μm) |
|---|---|---|---|---|---|
| Optical fiber of the invention | 1.0 | 0.21 | 3.5 | 6.5 | 0.92 |
| Conventional high NA fiber | 1.0 | 0.21 | 3.5 | 6.5 | 0.92 |
| Single-mode optical fiber | 0.35 | 0.12 | 8.2 | 10 | 1.28 |
| Er-doped optical fiber | 1.22 | 0.23 | 2.9 | 5.5 | 0.88 |

In both the optical fiber of the invention and the conventional high NA optical fiber, the relative refractive index difference between the core and the cladding Δ was 1.0%, the core diameter was 3.5 μm, the numerical aperture was 0.21, the effective cut-off wavelength was 0.92 μm, and the MFD with respect to light having a wavelength of 1550 nm was 6.5 μm.

To each of optical fiber couplers 12 that were made using either one of the two optical fibers, the erbium-doped optical fiber 11 and the single-mode optical fiber 13 were fusion-spliced, and the splice loss and the splicing strength of the fusion-spliced portion 16 were measured.

Procedures to measure the splice loss and the splicing strength of the fusion-spliced portion 16 will be explained.

After ends of each of the optical fibers to be spliced were flattened using a fiber cleaver or the like, the optical fibers were set to a conventional arc discharge-type fusion splicer. Then, the optical fibers were fusion-spliced in the presence of the arc, and the arc was maintained to conduct the heat treatment to further enlarge the MFDs. The arc current during the heat treatment was selected such that the temperature of the optical fibers was increased up to the glass softening point around between 1400 and 1600° C. During the heat treatment while fusion splicing and after splicing, the change in the propagation loss of the fusion-spliced portions 16 was measured to determine the minimum splice loss of the fusion-spliced portions 16 in which the propagation loss reached the lowest value. The change in propagation loss with respect to the length of time for which the arc was maintained was determined. The time to the minimum splice loss was defined as the arc maintaining time until the splice loss reached the lowest value. Then, 50 optical fibers were fusion-spliced using the time to the minimum splice loss for various combination of fibers, and tension test was carried out for the fusion-spliced portions 16. Upon conducting the tension test, the fusion-spliced samples were secured to a well-known tension tester, and the samples were pulled at a tension speed in which extension strain in one minute becomes 5% and tension force when the samples broke was recorded. The test was conducted for the 50 optical fibers, and the failure tension with which the cumulative failure probability becomes 50% was calculated. Here, the cumulative failure probability is defined as a probability of breakage when a certain failure tension or lower is applied. In this example, failure tension data of 50 optical fibers from the tension test were analyzed according to the method of Weibull analysis to determine the relationship between the cumulative failure probability and the failure tension. The results are listed in Table 2.

TABLE 2

| Fiber to be spliced (1) | Fiber to be spliced (2) | Min. splice loss (dB) | Time to min. splice loss (sec.) | Failure tension (GPa) when cumulative failure probability becomes 50% |
|---|---|---|---|---|
| Single-mode optical fiber | Optical fiber of the invention | 0.1 | 10 | 2.4 |
| Single-mode optical fiber | Conventional high NA fiber | 0.2 | 30 | 2.0 |
| Er-doped optical fiber | Optical fiber of the invention | 0.1 | 2 | 2.5 |
| Er-doped optical fiber | Conventional high NA fiber | 0.2 | 1 | 1.2 |

The results listed in Table 2 indicate that the minimum splice loss when spliced with a single-mode optical fiber was 0.1 dB for the optical fiber of the invention is, and 0.2 dB for the conventional high NA optical fiber. The time to the minimum splice loss was 10 seconds for the optical fiber of the invention, and 30 seconds for the conventional high NA optical fiber. This is because the MFD of the optical fiber of the invention and the MFD of the single-mode optical fiber are matched in a relatively short time since the diffusion rate of the dopants of the core is faster in the optical fiber of the invention.

In the tension test, the failure tension at which the cumulative failure probability becomes 50% was 2.4 GPa when the optical fiber of the invention and a single-mode optical fiber were fusion-spliced, and was 2.0 GPa when the conventional high NA optical fiber and the single-mode optical fiber were fusion-spliced. The conventional high NA optical fiber in which the time to the minimum splice loss was longer was weaker. In addition, when comparing strength of a spliced portion between single-mode optical fibers that are considered to have a relatively large splicing strength, the failure tension of the spliced portion between the single-mode optical fibers were 2.5 GPa, which was almost the same as the splicing strength between the optical fiber of the invention and a single-mode optical fiber. Thus, it was confirmed that the optical fiber of the invention can be spliced with a single-mode optical fiber with low loss and a sufficient strength.

In contrast, the minimum splice loss when spliced with an erbium-doped optical fiber was 0.1 dB for the optical fiber of the invention is, and was 0.2 dB for the conventional high NA optical fiber.

Figure 3:
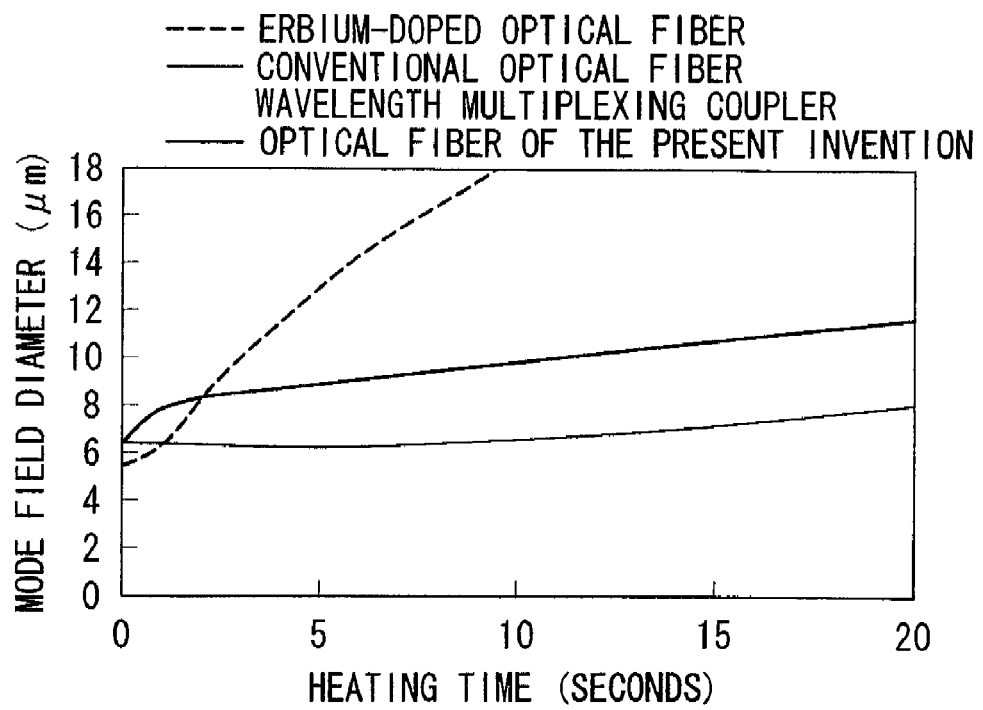
FIG. 3 is a diagram illustrating the change of MFDs with respect to heating time when fusion-splicing an erbium-doped optical fiber with the optical fiber shown in FIG. 1, or with a conventional high NA optical fiber.

FIG. 3 is a diagram illustrating the change of the MFDs with respect to heating time when fusion-splicing an erbium-doped optical fiber and the optical fiber of the invention or a conventional high NA optical fiber. The time to the minimum splice loss was 2 seconds for the optical fiber of the invention, and was 1 second for the conventional high NA optical fiber. Since the diffusion rate of the dopant in the core of the erbium-doped optical fiber is sufficiently larger than that of the conventional high NA optical fiber, the MFDs of the fibers are matched in a short time. In contrast, since the diffusion rate of the dopant in the core of the optical fiber of the invention is larger than the diffusion rate of the dopant in the core of the conventional high NA optical fiber in the early stage of the heating, it is possible to lengthen the time until the MFD of the optical fiber of the invention is matched with the MFD of the erbium-doped optical fiber longer than the conventional high NA optical fiber. As a result, it is possible to lengthen the time to the minimum splice loss to a relatively large value.

In the tension test, the failure tension at which the cumulative failure probability becomes 50% was 2.5 GPa when the optical fiber of the invention and an erbium-doped optical fiber were fusion-spliced, which was almost the same as the splicing strength of a spliced portion between single-mode optical fibers that is considered to have a relatively splicing strength. In contrast, the failure tension when fusion-splicing the conventional high NA optical fiber and the erbium-doped optical fiber was 1.2 GPa, meaning that spliced portion was very weak. This is because the sufficient splicing strength cannot be obtained since the time to the minimum splice loss in the combination of the conventional high NA optical fiber and the erbium-doped optical fiber is very short. For this reason, although the splicing between the conventional high NA optical fiber and the erbium-doped optical fiber has a low splice loss, the splicing cannot withstand practical use due to a weak splicing strength. In contrast, the optical fiber of the invention could be spliced with the erbium-doped optical fiber with low splice loss and a sufficient splicing strength.

Example 2

In another exemplary comparison, three types of optical fibers having a profile shown in FIG. 2($a$) were provided, except that each of which has a different inner cladding diameter. The diameters of the inner cladding of the optical fibers were 10 μm, 20 μm, or 40 μm, respectively.

As shown in FIG. 2($a$), the optical fiber of the invention has a two-layered cladding structure in which the outer periphery of the core is surrounded by the cladding in which the refractive index is smaller than in the core, and the cladding includes an inner cladding and an outer cladding, each of which has a different composition.

The core was made of silica-based glass doped with germanium (Ge) and fluorine (F) ($SiO_2/GeO_2/F$), and the contents of the dopants were 12% by weight, and 0.2% by weight for germanium and fluorine, respectively.

The inner cladding was made of silica-based glass doped with germanium, phosphorus (P), and fluorine ($SiO_2/GeO_2/P_2O_5/F$), and the contents of the dopants were about 1% by weight, about 1% by weight, and about 0.5% by weight for germanium, phosphorus and fluorine, respectively.

The outer cladding is made of silica-based glass ($SiO_2$).

There was little relative refractive index difference Δ between the inner cladding and the outer cladding.

All of the optical fibers were fabricated to have the same core structure as that of the optical fiber in Example 1 above. The relative refractive index difference A of the core was 1.0%, the numerical aperture was 0.21, the core diameter was 3.5 m, the MFD (1550 nm) was 6.5 μm, and the effective cut-off wavelength was 0.92 μm.

Similar to Example 1, each of the optical fibers having different inner cladding diameters was fusion-spliced with a single-mode optical fiber or an erbium-doped optical fiber, and the splice loss and the splicing strength were measured. The measurement was carried out using the same procedures as Example 1. The results are listed in Table 3.

TABLE 3

| Fiber of the invention | Fiber to be spliced | Min. splice loss (dB) | Time to min. splice loss (sec.) | Failure tension (GPa) when cumulative failure probability becomes 50% |
|---|---|---|---|---|
| Inner cladding of 10 μm | Single-mode optical fiber | 0.12 | 18 | 2.2 |
| Inner cladding of 20 μm | Single-mode optical fiber | 0.10 | 10 | 2.4 |
| Inner cladding of 40 μm | Single-mode optical fiber | 0.12 | 4.5 | 2.5 |

TABLE 3-continued

| Fiber of the invention | Fiber to be spliced | Min. splice loss (dB) | Time to min. splice loss (sec.) | Failure tension (GPa) when cumulative failure probability becomes 50% |
|---|---|---|---|---|
| Inner cladding of 10 μm | Er-doped optical fiber | 0.12 | 1.8 | 2.3 |
| Inner cladding of 20 μm | Er-doped optical fiber | 0.10 | 2.0 | 2.5 |
| Inner cladding of 40 μm | Er-doped optical fiber | 0.12 | 4.0 | 2.4 |

The results listed in Table 3 indicate that although the optical fiber having an inner cladding diameter of 20 μm exhibited the most favorable splice loss, the difference between the optical fibers having an inner cladding diameter of 10 μm or 40 μm was about 0.02 dB. All of the three optical fibers exhibited an excellent splicing strength. Thus, it was confirmed that the optical fiber of the invention having a diameter of the inner cladding between 10 μm and 40 μm can be spliced with a single-mode optical fiber or an erbium-doped optical fiber with low loss and a sufficient strength.

Comparative Example 1

As a matter of further comparison, two types of optical fibers having the same profile as optical fibers in Example 2 were provided, except that the inner cladding diameters were different from the optical fibers in Example 2. The diameters of the inner cladding of the optical fibers were 5 μm or 45 μm, respectively.

Similar to Example 1, each of the optical fibers having different inner cladding diameters was fusion-spliced with a single-mode optical fiber or an erbium-doped optical fiber, and the splice loss and the splicing strength were measured. The measurement was carried out using the same procedures as Example 1. The results are listed in Table 4.

TABLE 4

| Fiber of the invention | Fiber to be spliced | Min. splice loss (dB) | Time to min. splice loss (sec.) | Failure tension (GPa) when cumulative failure probability becomes 50% |
|---|---|---|---|---|
| Inner cladding of 5 μm | Single-mode optical fiber | 0.18 | 25 | 2.1 |
| Inner cladding of 45 μm | Single-mode optical fiber | 0.18 | 1.5 | 2.0 |
| Inner cladding of 5 μm | Er-doped optical fiber | 0.15 | 1.2 | 1.8 |
| Inner cladding of 45 μm | Er-doped optical fiber | 0.15 | 5.0 | 2.4 |

The results listed in Table 4 indicate that some optical fibers exhibited higher splice loss than the optical fibers in Example 2 and had a splicing strength below 2.0 GPa.

Thus, it was confirmed that an optical fiber having an inner cladding diameter out of the range between 10 μm and 40 μm exhibited inferior splicing characteristic to the optical fiber of the invention when spliced with a single-mode optical fiber or an erbium-doped optical fiber.

Example 3

In a further comparative example, three types of optical fibers A, B, and C having a profile shown in FIG. 2(a) were provided, each having a different dopant content.

The inner cladding of the optical fiber A was made of silica-based glass doped with germanium, phosphorus (P), and fluorine ($SiO_2/GeO_2/P_2O_5/F$), and the contents of the dopants were 0.2% by weight, 0.5% by weight, and 0.1% by weight for germanium, phosphorus and fluorine, respectively.

The inner cladding of the optical fiber B was made of silica-based glass doped with germanium, phosphorus (P), and fluorine ($SiO_2/GeO_2/P_2O_5/F$), and the contents of the dopants were about 1% by weight, about 1% by weight, and about 0.5% by weight for germanium, phosphorus and fluorine, respectively.

The inner cladding of the optical fiber C was made of silica-based glass doped with germanium, phosphorus (P), and fluorine ($SiO_2/GeO_2/P_2O_5/F$), and the contents of the dopants were 1.5% by weight, 1.5% by weight, and 1.0% by weight for germanium, phosphorus and fluorine, respectively.

Parameters other than the dopant concentration in the inner cladding were the same as those of the optical fibers in Example 1.

In other words, the core was made of silica-based glass doped with germanium (Ge) and fluorine (F) ($SiO_2/GeO_2/F$), and the contents of the dopants were 12% by weight, and 0.2% by weight for germanium and fluorine, respectively.

The outer cladding is made of silica-based glass ($SiO_2$).

There was little relative refractive index difference Δ between the inner cladding and the outer cladding.

All of the structural parameters of the core were the same as the structural parameters of the optical fiber of the invention listed in Table 1. The relative refractive index difference Δ of the core was 1.0%, the numerical aperture was 0.21, the core diameter was 3.5 μm, the MFD (@1550 nm) was 6.5 μm, and the effective cut-off wavelength was 0.92 μm. The diameter of the inner cladding was 20 μm.

Similar to Example 1, each of the optical fibers having different dopant contents in the inner cladding was fusion-spliced with a single-mode optical fiber or an erbium-doped optical fiber, and the splice loss and the splicing strength were measured. The measurement was carried out using the same procedures as Example 1. The results are listed in Table 5.

TABLE 5

| Fiber of the invention | Fiber to be spliced | Min. splice loss (dB) | Time to min. splice loss (sec.) | Failure tension (GPa) when cumulative failure probability becomes 50% |
|---|---|---|---|---|
| Fiber A (low conc.) | Single-mode optical fiber | 0.11 | 16 | 2.3 |
| Fiber B (middle conc.) | Single-mode optical fiber | 0.10 | 10 | 2.4 |
| Fiber C (high conc.) | Single-mode optical fiber | 0.12 | 5.0 | 2.4 |
| Fiber A (low conc.) | Er-doped optical fiber | 0.12 | 1.7 | 2.1 |
| Fiber B (middle conc.) | Er-doped optical fiber | 0.10 | 2.0 | 2.5 |
| Fiber C (high conc.) | Er-doped optical fiber | 0.12 | 2.5 | 2.5 |

The results listed in Table 5 indicate although the optical fiber B exhibited the most favorable splice loss, the difference between the optical fiber A or C was about 0.02 dB. All three fibers had an excellent splicing strength.

Thus, it was confirmed that the optical fiber of the invention in which the concentration of germanium is between 3.0 and 21.0% by weight in the core, and the concentration of fluorine is between 0 and 1.0% by weight in the core, the concentration of germanium is between 0.2 and 1.5% by weight in the inner cladding, and the concentration of phosphorus is between 0.5 and 1.5% by weight in the inner cladding, and the concentration of fluorine is between 0.1 and 1.0% by weight in the inner cladding can be spliced with a single-mode optical fiber or an erbium-doped optical fiber with low loss and a sufficient strength.

Comparative Example 2

As a matter of comparison, two types of optical fibers D and E having the same profile as optical fibers in Example 3 were provided, except that the dopant concentrations of the inner cladding were different from the optical fibers in Example 3.

The inner cladding of the optical fiber D was made of silica-based glass doped with phosphorus (P) and fluorine ($SiO_2/P_2O_5/F$), and the contents of the dopants were 0.2% by weight and 0.05% by weight for phosphorus and fluorine, respectively.

The inner cladding of the optical fiber E was made of silica-based glass doped with germanium, phosphorus (P), and fluorine ($SiO_2/GeO_2/P_2O_5/F$), and the contents of the dopants were about 2.0% by weight, about 2.0% by weight, and about 1.2% by weight for germanium, phosphorus and fluorine, respectively.

Similar to Example 1, each of the optical fibers having different dopant contents in the inner cladding was fusion-spliced with a single-mode optical fiber or an erbium-doped optical fiber, and the splice loss and the splicing strength were measured. The measurement was carried out using the same procedures as Example 1. The results are listed in Table 6.

TABLE 6

| Fiber to be spliced (1) | Fiber to be spliced (2) | Min. splice loss (dB) | Time to min. splice loss (sec.) | Failure tension (GPa) when cumulative failure probability becomes 50% |
| --- | --- | --- | --- | --- |
| Fiber D (lowest conc.) | Single-mode optical fiber | 0.14 | 20 | 2.2 |
| Fiber E (highest conc.) | Single-mode optical fiber | 0.22 | 1.5 | 1.9 |
| Fiber D (lowest conc.) | Er-doped optical fiber | 0.14 | 1.5 | 1.9 |
| Fiber E (highest conc.) | Er-doped optical fiber | 0.15 | 3.5 | 2.4 |

The results listed in Table 6 indicate that some optical fibers exhibited higher splice loss than the optical fibers in Example 3 and had a splicing strength below 2.0 GPa.

Thus, it was confirmed that an optical fiber in which the concentration of germanium is 12% by weight in the core, and the concentration of fluorine is 0.2% by weight in the core, and the concentration of germanium is out of the range between 0.2 and 1.5% by weight in the inner cladding, the concentration of phosphorus is out of the range between 0.5 and 1.5% by weight in the inner cladding, and the concentration of fluorine is out of the range between 0.1 and 1.0% by weight in the inner cladding exhibited inferior splicing characteristics when spliced with a single-mode optical fiber or an erbium-doped optical compared to the optical fiber of the invention.

Furthermore, the change in the mode field diameter (MFD) with respect to heating time of the optical fibers A to E mentioned above is shown in FIG. 4.

Figure 4:
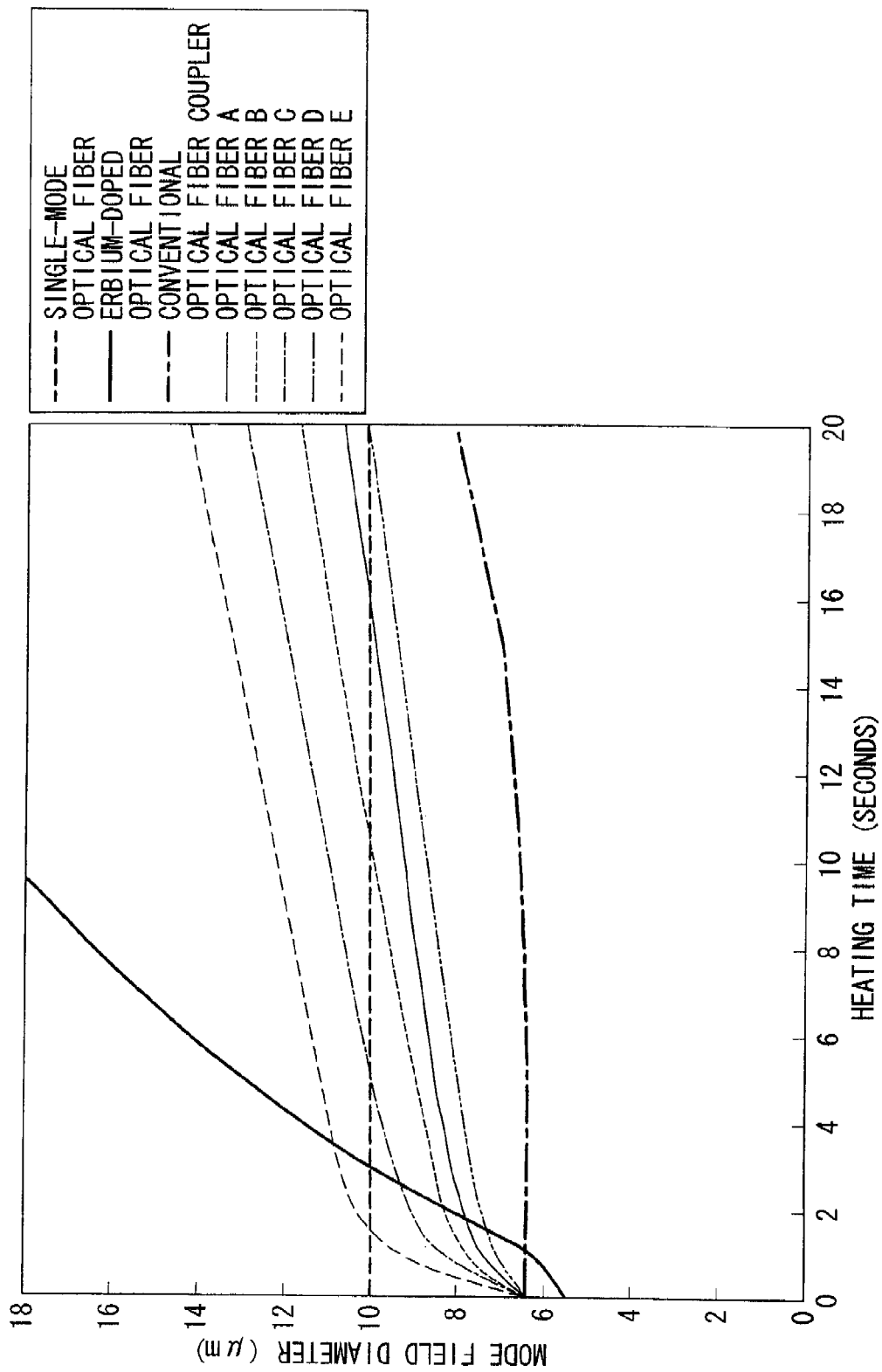
FIG. 4 is a diagram illustrating the change in the MFDs with respect to heating time of exemplary optical fibers of the invention and comparative optical fibers.

It was confirmed from FIG. 4 that the optical fibers A, B, and C which are the optical fibers of the invention, can be fusion-spliced with single-mode optical fiber or an erbium-doped optical fiber with low loss and a sufficient strength.

Example 4

Figure 5:
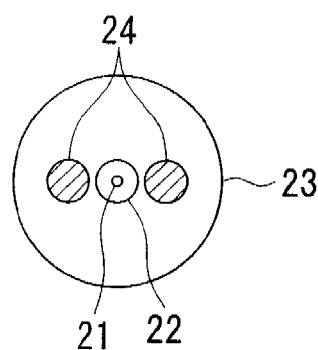
FIG. 5 is a cross-sectional view of an exemplary embodiment of the invention showing a PANDA polarization maintaining optical fiber.

In another example according to the invention, three types of PANDA polarization maintaining optical fibers having a profile shown in FIG. 5 were provided, except that each of which has a different inner cladding diameter.

The PANDA polarization maintaining optical fibers were optical fibers, each of which includes a core 21 with a diameter of 3.5 μm, an inner cladding 22, an outer cladding 23 having a diameter of 125 μm, and two stress-applying parts 24 and 24 that are symmetrically disposed with respect to the core 21.

The diameters of the inner cladding 22 of the optical fibers were 10 μm, 20 μm, or 40 μm, respectively.

The core 21 was made of silica-based glass doped with germanium (Ge) and fluorine (F) ($SiO_2/GeO_2/F$), and the contents of the dopants were 12% by weight, and 0.2% by weight for germanium and fluorine, respectively.

The inner cladding 22 was made of silica-based glass doped with germanium, phosphorus (P), and fluorine ($SiO_2/GeO_2/P_2O_5/F$), and the contents of the dopants were about 1% by weight, about 1% by weight, and about 0.5% by weight for germanium, phosphorus and fluorine, respectively.

The outer cladding 23 is made of silica-based glass ($SiO_2$).

Two stress-applying parts 24 and 24 were made of silica-based glass doped with boron ($SiO_2/B_2O_3$).

There was little relative refractive index difference Δ between the inner cladding 22 and the outer cladding 23.

The relative refractive index difference Δ of the core was 1.0%, the MFD (1550 nm) was 6.5 μm, and the effective cut-off wavelength was 0.92 μm.

Similar to Example 1, each of the PANDA polarization maintaining optical fibers having different inner cladding diameters was fusion-spliced with a single-mode optical fiber or an erbium-doped optical fiber, and the splice loss and the splicing strength were measured. The measurement was carried out using the same procedures as Example 1. The results are listed in Table 7.

TABLE 7

| PANDA polarization maintaining fiber | Fiber to be spliced | Min. splice loss (dB) | Time to min. splice loss (sec.) | Failure tension (GPa) when cumulative failure probability becomes 50% |
| --- | --- | --- | --- | --- |
| Inner cladding of 10 μm | Single-mode optical fiber | 0.12 | 18 | 2.2 |
| Inner cladding of 20 μm | Single-mode optical fiber | 0.10 | 10 | 2.4 |
| Inner cladding of 40 μm | Single-mode optical fiber | 0.12 | 4.5 | 2.5 |
| Inner cladding of 10 μm | Er-doped optical fiber | 0.12 | 1.8 | 2.3 |

TABLE 7-continued

| PANDA polarization maintaining fiber | Fiber to be spliced | Min. splice loss (dB) | Time to min. splice loss (sec.) | Failure tension (GPa) when cumulative failure probability becomes 50% |
|---|---|---|---|---|
| Inner cladding of 20 μm | Er-doped optical fiber | 0.10 | 2.0 | 2.5 |
| Inner cladding of 40 μm | Er-doped optical fiber | 0.12 | 4.0 | 2.4 |

The results listed in Table 7 indicate that although the optical fiber having a diameter of the inner cladding 22 of 20 μm exhibited the most favorable splice loss, the difference between the optical fibers having a diameter of the inner cladding 22 of 10 μm or 40 μm was about 0.02 dB. All of the three optical fibers exhibited an excellent splicing strength. Thus, it was confirmed that the PANDA polarization maintaining optical fiber having a diameter of the inner cladding between 10 μm and 40 μm can be spliced with a single-mode optical fiber or an erbium-doped optical fiber with low loss and a sufficient strength.

Comparative Example 3

As a matter of comparison, two types of optical fibers having the same profile as the PANDA optical fibers in Example 4 were provided, except that the inner cladding diameters were varied from the optical fibers in Example 4. The diameters of the inner cladding of the optical fibers were 5 μm or 45 μm, respectively.

Similar to Example 1, each of the PANDA polarization maintaining optical fibers having different inner cladding diameters was fusion-spliced with a single-mode optical fiber or an erbium-doped optical fiber, and the splice loss and the splicing strength were measured. The measurement was carried out using the same procedures as Example 1. The results are listed in Table 8.

TABLE 8

| PANDA polarization maintaining fiber | Fiber to be spliced | Min. splice loss (dB) | Time to min. splice loss (sec.) | Failure tension (GPa) when cumulative failure probability becomes 50% |
|---|---|---|---|---|
| Inner cladding of 5 μm | Single-mode optical fiber | 0.18 | 25 | 2.1 |
| Inner cladding of 45 μm | Single-mode optical fiber | 0.18 | 1.5 | 2.0 |
| Inner cladding of 5 μm | Er-doped optical fiber | 0.15 | 1.2 | 1.8 |
| Inner cladding of 45 μm | Er-doped optical fiber | 0.15 | 5.0 | 2.4 |

The results listed in Table 8 indicate that some optical fibers exhibited higher splice loss than the optical fibers in Example 4 and had a splicing strength below 2.0 GPa.

Thus, it was confirmed that a PANDA polarization maintaining optical fiber having an inner cladding diameter out of the range between 10 μm and 40 μm exhibited inferior splicing characteristic to the PANDA polarization maintaining optical fiber of the invention when spliced with a single-mode optical fiber or an erbium-doped optical fiber.

Example 5

According to another example of the invention, three types of PANDA polarization maintaining optical fibers F, G and H having a profile shown in FIG. 5 were provided, each of which has a different dopant content.

The inner cladding 22 of the optical fiber F was made of silica-based glass doped with germanium, phosphorus (P), and fluorine ($SiO_2/GeO_2/P_2O_5/F$), and the contents of the dopants were 0.2% by weight, 0.5% by weight, and 0.1% by weight for germanium, phosphorus and fluorine, respectively.

The inner cladding 22 of the optical fiber G was made of silica-based glass doped with germanium, phosphorus (P), and fluorine ($SiO_2/GeO_2/P_2O_5/F$), and the contents of the dopants were about 1% by weight, about 1% by weight, and about 0.5% by weight for germanium, phosphorus and fluorine, respectively.

The inner cladding 22 of the optical fiber H was made of silica-based glass doped with germanium, phosphorus (P), and fluorine ($SiO_2/GeO_2/P_2O_5/F$), and the contents of the dopants were 1.5% by weight, 1.5% by weight, and 1.0% by weight for germanium, phosphorus and fluorine, respectively.

Parameters other than the dopant concentration in the inner cladding 22 and the presence of the stress-applying parts 24 and 24 were the same as the optical fibers in Example 1.

In other words, the core was made of silica-based glass doped with germanium (Ge) and fluorine (F) ($SiO_2/GeO_2/F$), and the contents of the dopants were 12% by weight, and 0.2% by weight for germanium and fluorine, respectively.

The outer cladding 23 is made of silica-based glass ($SiO_2$).

There was little relative refractive index difference Δ between the inner cladding 22 and the outer cladding 23.

The relative refractive index difference Δ of the core 21 was 1.0%, the MFD (@1550 nm) was 6.5 μm, and the effective cut-off wavelength was 0.92 μm. The diameter of the inner cladding 22 was 20 μm.

Similar to Example 1, each of the PANDA polarization maintaining optical fibers having different dopant contents in the inner cladding was fusion-spliced with a single-mode optical fiber or an erbium-doped optical fiber, and the splice loss and the splicing strength were measured. The measurement was carried out using the same procedures as Example 1. The results are listed in Table 9.

TABLE 9

| PANDA polarization maintaining fiber | Fiber to be spliced | Min. splice loss (dB) | Time to min. splice loss (sec.) | Failure tension (GPa) when cumulative failure probability becomes 50% |
|---|---|---|---|---|
| Fiber F (low conc.) | Single-mode optical fiber | 0.11 | 16 | 2.3 |
| Fiber G (middle conc.) | Single-mode optical fiber | 0.10 | 10 | 2.4 |
| Fiber H (high conc.) | Single-mode optical fiber | 0.12 | 5.0 | 2.4 |
| Fiber F (low conc.) | Er-doped optical fiber | 0.12 | 1.7 | 2.1 |
| Fiber G (middle conc.) | Er-doped optical fiber | 0.10 | 2.0 | 2.5 |
| Fiber H (high conc.) | Er-doped optical fiber | 0.12 | 2.5 | 2.5 |

The results listed in Table 9 indicate although the optical fiber G exhibited the most favorable splice loss, the difference between the optical fiber F or H was about 0.02 dB. All three fibers had an excellent splicing strength.

Thus, it was confirmed that the PANDA polarization maintaining optical fiber of the invention in which the concentration of germanium is between 3.0 and 21.0% by weight in the core 21, and the concentration of fluorine is between 0 and 1.0% by weight in the core 21, the concentration of germanium is between 0.2 and 1.5% by weight in the inner cladding, the concentration of phosphorus is between 0.5 and 1.5% by weight in the inner cladding, and the concentration of fluorine is between 0.1 and 1.0% by weight in the inner cladding can be spliced with a single-mode optical fiber or an erbium-doped optical fiber with low loss and a sufficient strength.

Comparative Example 4

As a matter of comparison, two types of PANDA polarization maintaining optical fibers I and J having the same profile as optical fibers in Example 5 were provided, except that the dopant concentrations of the inner cladding 22 were varied from the optical fibers in Example 3.

The inner cladding of the optical fiber I was made of silica-based glass doped with phosphorus (P) and fluorine ($SiO_2/P_2O_5/F$), and the contents of the dopants were 0.2% by weight, and 0.05% by weight for phosphorus and fluorine, respectively.

The inner cladding of the optical fiber J was made of silica-based glass doped with germanium, phosphorus (P), and fluorine ($SiO_2/GeO_2/P_2O_5/F$), and the contents of the dopants were about 2.0% by weight, about 2.0% by weight and about 1.2% by weight for germanium, phosphorus and fluorine, respectively.

Similar to Example 1, each of the PANDA polarization maintaining optical fibers having different dopant contents in the inner cladding 22 was fusion-spliced with a single-mode optical fiber or an erbium-doped optical fiber, and the splice loss and the splicing strength were measured. The measurement was carried out using the same procedures as Example 1. The results are listed in Table 10.

TABLE 10

| PANDA polarization maintaining fiber | Fiber to be spliced (2) | Min. splice loss (dB) | Time to min. splice loss (sec.) | Failure tension (GPa) when cumulative failure probability becomes 50% |
| --- | --- | --- | --- | --- |
| Fiber I (lowest conc.) | Single-mode optical fiber | 0.14 | 20 | 2.2 |
| Fiber J (highest conc.) | Single-mode optical fiber | 0.22 | 1.5 | 1.9 |
| Fiber I (lowest conc.) | Er-doped optical fiber | 0.14 | 1.5 | 1.9 |
| Fiber J (highest conc.) | Er-doped optical fiber | 0.15 | 3.5 | 2.4 |

The results listed in Table 10 indicate that some optical fibers exhibited higher splice loss than the optical fibers in Example 5 and had a splicing strength below 2.0 GPa.

Thus, it was confirmed that a PANDA polarization maintaining optical fiber in which the concentration of germanium 12% by weight in the core 21 and the concentration of fluorine is 0.2% by weight in the core 21, and the concentration of germanium is out of the range between 0.2 and 1.5% by weight in the inner cladding 22, the concentration of phosphorus is out of the range between 0.5 and 1.5% by weight in the inner cladding 22, and the concentration of fluorine is out of the range between 0.1 and 1.0% by weight in the inner cladding 22 exhibited inferior splicing characteristics when spliced with a single-mode optical fiber or an erbium-doped optical compared to the optical fiber of the invention.

Example 6

Figure 6:
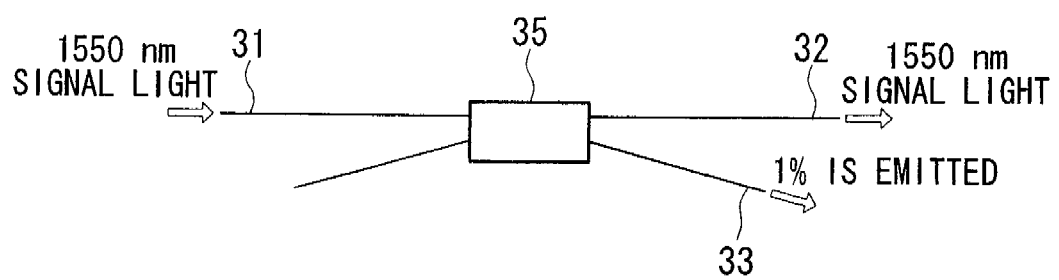
FIG. 6 is a schematic diagram of an exemplary embodiment of the invention showing a tap coupler.

In another example of the invention, an optical power coupling/dividing coupler having the structure shown in FIG. 6 was fabricated.

This optical power coupling/dividing coupler is one type of optical fiber coupler, i.e., a so-called "tap coupler," which is for extracting a very small amount of light for monitoring lines. This tap coupler was designed such that one percent of the power of signal light having a wavelength of 1550 nm is extracted.

In this optical power coupling/dividing coupler, when signal light having a wavelength of 1550 nm is incident to a first port 31, one percent of the optical power that is divided in the optical fiber coupler 35 is emitted from a third port 33 and the rest of the optical power is emitted from a second port 32.

This tap coupler was fabricated using an optical fiber of the invention. The outer diameter of this optical fiber was 80 μm, which is smaller than the outer diameter of 125 μm of a conventional optical fiber. This optical fiber was an optical fiber that includes a core having a diameter of about 7.2 μm, an inner cladding having a diameter of 20 μm, and an outer cladding having a diameter of 80 μm.

The core was made of silica-based glass doped with germanium (Ge) and fluorine (F) ($SiO_2/GeO_2/F$), and the contents of the dopants were 6.3% by weight and 0.2% by weight for germanium and fluorine, respectively.

The inner cladding was made of silica-based glass doped with germanium, phosphorus (P), and fluorine ($SiO_2/GeO_2/P_2O_5/F$), and the contents of the dopants were about 1% by weight, about 1% by weight, and about 0.5% by weight for germanium, phosphorus and fluorine, respectively.

The outer cladding is made of silica-based glass ($SiO_2$).

The relative refractive index difference Δ of the core was 0.54%, the MFD (@1550 nm) was 8.3 μm, and the effective cut-off wavelength was 1.34 μm.

The inner cladding and the outer cladding had almost the same refractive index.

Two such optical fibers were provided, arranged in parallel, and fused and elongated to fabricate a tap coupler that extracts one percent of the power of signal light having a wavelength of 1550 nm.

The coupling length of this tap coupler was 5 mm. Since the optical fiber of the invention included the inner cladding and had an outer diameter or 80 μm, the coupling length could be reduced. As a result, the size of the tap coupler could be reduced.

Comparative Example 5

As a matter of comparison, a tap coupler similar to the tap coupler in Example 6 was fabricated using a conventional optical fiber. The optical fiber employed in this comparative example was an optical fiber that has an outer diameter of 125 μm, and includes a core having a diameter of about 7.2 μm and a cladding having a diameter of 125 μm.

The core was made of silica-based glass doped with germanium (Ge) and fluorine (F) ($SiO_2/GeO_2/F$), and the contents of the dopants were 6.3% by weight and 0.2% by weight for germanium and fluorine, respectively.

The cladding was made of pure silica-based glass ($SiO_2$).

The relative refractive index difference Δ of the core was 0.54%, the MFD (@1550 nm) was 8.3 μm, and the effective cut-off wavelength was 1.34 μm.

Two such optical fibers were provided, arranged in parallel, and fused and elongated to fabricate a tap coupler that extracts one percent of the power of signal light having a wavelength of 1550 nm.

The coupling length of this tap coupler was 14 mm. It was found that the coupling length was large and the size of the tap coupler using the conventional optical fiber could not be reduced sufficiently compared to the tap coupler of Example 6.

Example 7

Figure 7:
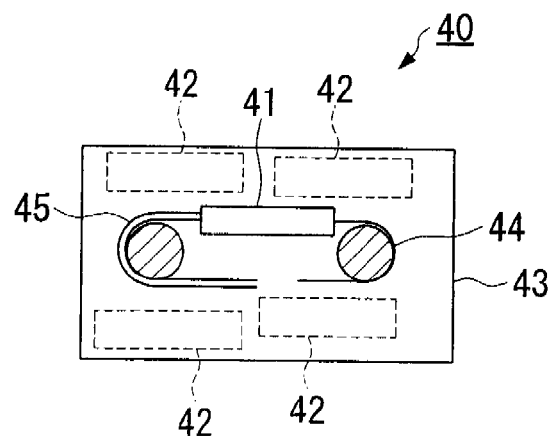
FIG. 7 is a schematic cross-sectional view of an exemplary embodiment of the invention showing a package of an erbium-doped optical fiber amplifier.
Figure 8:
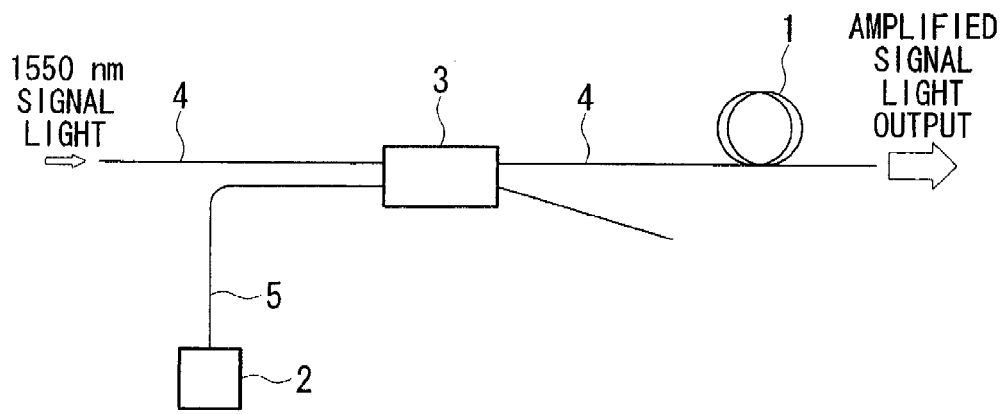
FIG. 8 is a schematic diagram illustrating one example of the constitution of an erbium-doped optical fiber amplifier.
Figure 9:
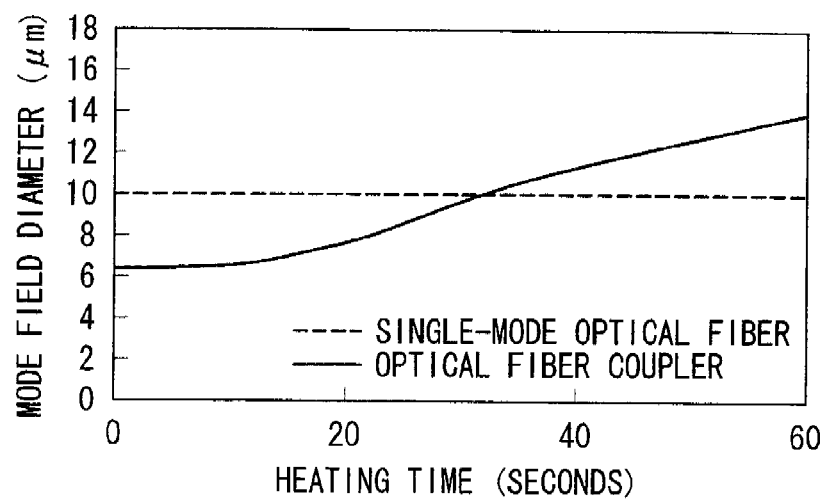
FIG. 9 is a diagram illustrating the change in the MFDs with respect to heating time of an optical fiber coupler and a single-mode optical fiber.
Figure 10:
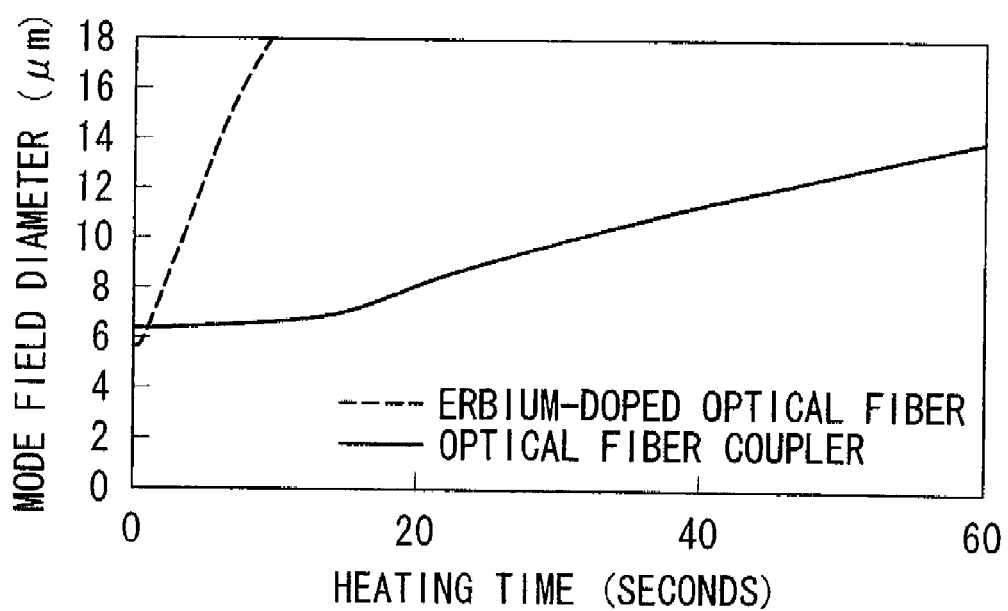
FIG. 10 is a diagram illustrating the change in the MFDs with respect to heating time of an optical fiber coupler and an erbium-doped optical fiber.

In another example according to the invention, an erbium-doped optical fiber amplifier 40 having the structure shown in FIG. 7 was fabricated.

This erbium-doped optical fiber amplifier 40 includes a wavelength division multiplexing coupler (hereinafter abbreviated as "WDM coupler") 41 and other components 42 that are contained in a housing 43. The dimensions of the erbium-doped optical fiber amplifier 40 were height of 70 mm by width of 90 mm by depth of 12 mm.

Other parts 42 included an excitation 980-nm laser diode for excitation, an optical isolator, a tap coupler, and the like. In order to house a number of components, the excess length of the optical fiber of the WDM coupler 41 was wound about cylindrical members 44, each of which has a radius of 10 mm to save space.

The WDM coupler was fabricated using an optical fiber of the invention. The outer diameter of this optical fiber 45 was 80 μm, which is smaller than the outer diameter of 125 μm of a conventional optical fiber. The optical fiber 45 is an optical fiber that includes a core having a diameter of about 3.1 μm, an inner cladding having a diameter of 20 μm, and an outer cladding having a diameter of 80 μm.

The core was made of silica-based glass doped with germanium (Ge) and fluorine (F) ($SiO_2/GeO_2/F$), and the contents of the dopants were 14% by weight and 0.2% by weight for germanium and fluorine, respectively.

The inner cladding was made of silica-based glass doped with germanium, phosphorus (P), and fluorine ($SiO_2/GeO_2/P_2O_5/F$), and the contents of the dopants were about 1% by weight, about 1% by weight, and about 0.5% by weight for germanium, phosphorus and fluorine, respectively.

The outer cladding is made of silica-based glass ($SiO_2$).

The relative refractive index difference Δ of the core was 1.25%, the MFD (1550 nm) was 6.0 μm, and the effective cut-off wavelength was 0.92 μm.

The inner cladding and the outer cladding had almost the same refractive index.

The bending loss of the optical fiber 45 when wound with a bending radius of 10 mm by 5 turns was 0.05 dB in a wavelength of 1.610 μm, and was less than 0.05 dB in wavelengths shorter than 1.610 μm, which was almost 0 dB.

Two of the optical fibers 45 were provided, arranged in parallel, and fused and elongated to fabricate the WDM coupler 41 that multiplexes/demultiplexes an excitation light having a wavelength of 980 nm and signal light having a wavelength of 1550 nm.

Since the WDM coupler 41 fabricated in the manner described above includes the optical fiber 45 having an outer diameter of 80 μm, it exhibits less strain due to bending than a WDM coupler including a conventional optical fiber having an outer a diameter of 125 μm. Thus, the WDM coupler of the invention that employs the optical fiber 45 having an outer diameter of 80 μm exhibits a lower breaking failure rate.

The method for calculating breaking failure rate of optical fibers is disclosed in Y. Mitsunaga et al., "Strength assurance of optical fiber based on screening test," Trans. IEICE July 1983, vol. J. 66-B, No. 7, pp. 829-836, 1983. In general, it is required to assure a breaking failure rate of optical fibers of 10-5 (one failure per 100,000 units) for a duration of 20 years. When an optical fiber having an outer a diameter of 125 μm is employed in a conventional WDM coupler with a bending radius of 10 mm, the breaking failure rate would exceed 10-5 by far in 20 years, meaning that this WDM couple cannot withstand practical use. In contrast, it was confirmed from the document described above that when an optical fiber of the invention is employed in the WDM coupler with a bending radius of 10 mm, a breaking failure rate of 10-5 can be assured for a duration of 20 years.

Furthermore, the WDM coupler including the optical fiber of the invention has a coupling length of 5.4 mm, which is far shorter than the coupling length of a conventional WDM coupler.

Similar to Example 6, since the optical fiber of the invention includes an inner cladding, and has an outer diameter of 80 μm, it is possible to reduce the coupling length. In the WDM coupler 41 of Example 7, the coupling length could be significantly reduced to 5.4 mm, and consequently the overall size of the WDM coupler 41 was reduced.

Since the WDM coupler is used in an erbium-doped optical fiber amplifier, the WDM coupler 41 of this example will be spliced to an optical fiber having a different MFD. Similar to Example 1, since the WDM coupler 41 included an optical fiber in which the concentrations of the dopants in the inner cladding were about 1% by weight, about 1% by weight, and about 0.5% by weight, for germanium, phosphorus, and fluorine, the WDM coupler 41 could provide a splicing with low loss and a sufficient strength as Example 1.

Accordingly, it was confirmed that a WDM coupler that includes an optical fiber of the invention including an inner cladding and having an outer diameter of 80 μm has a smaller dimension and smaller allowable bending radius than a conventional WDM coupler, and exhibits an excellent splicing characteristic. Accordingly, the WDM coupler of the invention can be applied to an erbium-doped optical fiber amplifier having a reduced size than a conventional erbium-doped optical fiber amplifier.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

INDUSTRIAL APPLICABILITY

As described above, since the optical fiber of the invention is an optical fiber including a core that is provided at a center, the core being made of silica glass containing at least germanium, an inner cladding having a large diffusion coefficient, the inner cladding being provided around the core and concentric to the core, and an outer cladding having a small diffusion coefficient, the outer cladding being provided around the inner cladding, in which the inner cladding contains germanium, and a concentration of germanium in the core is about 200% or more of a concentration of germanium in the inner cladding, it can be spliced with an optical fiber having a different MFD, such as a single-mode optical fiber or an erbium-doped optical fiber, with low splice loss and a sufficient splicing strength.

The invention claimed is:

1. An optical fiber, comprising:
   a core that is provided at a center, the core being made of silica glass containing at least germanium;
   an inner cladding made of silica glass, the inner cladding being provided concentric to the core; and
   an outer cladding made of silica glass, the outer cladding being provided around the inner cladding,
   wherein the inner cladding contains germanium, and a concentration of germanium in the core is about 200% or more of a concentration of germanium in the inner cladding,
   a diameter of the inner cladding is between 10 μm and 40 μm, the inner cladding containing germanium of between 0.2% by weight and 1.5% by weight, phosphorus of between 0.5% by weight and 1.5% by weight, and fluorine of between 0.1% by weight and 1.0% by weight, a diffusion coefficient of germanium diffused in the inner cladding being relatively large, a refractive index of the inner cladding being substantially the same as a refractive index of silica glass,
   a diffusion coefficient of germanium diffused in the outer cladding is relatively smaller than in the inner cladding, and
   an enlarged mode field diameter of the optical fiber during splicing with a second silica glass optical fiber by means of heating using an arc discharge for a time to a minimum splicing loss is matched with an enlarged mode field diameter of the second silica glass optical fiber, a failure tension with which a cumulative failure probability becomes 50% is over 2.0 GPa after the fusion splicing.

2. The optical fiber according to claim 1, wherein fluorine is doped in the core.

3. The optical fiber according to claim 1, wherein an outer diameter of the optical fiber is between 70 μm and 90 μm.

4. The optical fiber according to claim 1, further comprising two stress-applying parts that are symmetrically disposed with respect to the core within the cladding around the core.

5. The optical fiber according to claim 1, wherein the second silica glass optical fiber is a single mode optical fiber.

6. The optical fiber according to claim 1, wherein the second silica glass optical fiber is an erbium-doped optical fiber.

7. A optical fiber coupler comprising the optical fiber according to claim 1.

* * * * *